Aug. 31, 1926.
J. T. FOX ET AL
1,598,571
MEANS FOR INDICATING THE TEMPERATURES OF DISTANT OR INACCESSIBLE PLACES
Filed Oct. 6, 1923
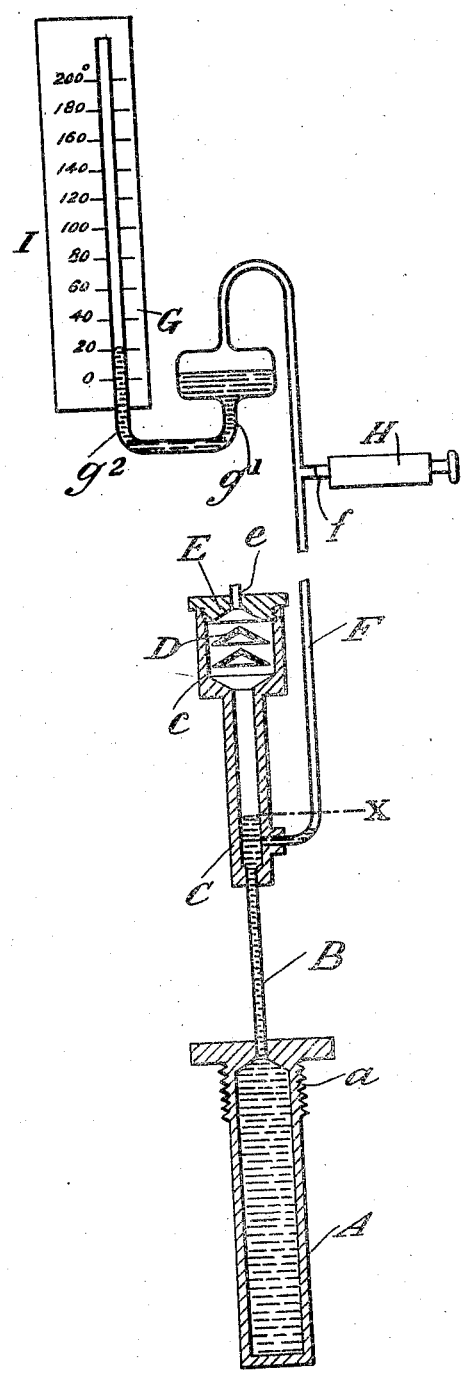
Inventors
James T. Fox
Arthur J. Malone
By James L. Norris
Attorney Patented Aug. 31, 1926.

1,598,571

UNITED STATES PATENT OFFICE.

JAMES TREVELYAN FOX AND ARTHUR JENNENS MALONE, OF NEWCASTLE-ON-TYNE, ENGLAND.

MEANS FOR INDICATING THE TEMPERATURES OF DISTANT OR INACCESSIBLE PLACES.

Application filed October 6, 1923, Serial No. 667,035, and in Great Britain March 17, 1923.

The invention relates to means for indicating the temperature of distant or inacessible places.

According to the invention, a bulb is inserted at the position of which the temperature is required, the bulb containing a liquid of which the volume varies with the temperature. The bulb is connected with a vessel, containing mercury or other suitable liquid, the level of which varies with the changes of volume of the substance contained in the bulb and means are provided for causing air to flow upwards through the liquid in the blower, the pressure of the air being indicated in a gauge, which may be placed in any required position relatively to the bulb and the liquid containing vessel.

The arrangements are such that the difference between the pressure of the air flowing through the liquid and the atmospheric pressure depends on the height of the column of liquid in the liquid containing vessel above the point at which the air tube enters the same, the temperature of the bulb when the level of the liquid in the said vessel is at the junction of the air tube corresponding to the zero of the scale on the gauge.

In one construction according to the invention the upper part of the liquid containing vessel communicates with the surrounding atmosphere and a tube of fine bore connects the lower end of the said vessel with the indicating gauge and is branched to an air pump by which the pressure of the air is raised sufficiently to enable it to flow upwards through the liquid, preferably mercury, in the vessel. The indicating gauge, which may conveniently be a siphon barometer tube of which one leg is open to the atmosphere and the other leg to the connecting air tube, consequently, shows the excess of this air pressure above the atmosphere and this pressure depends upon the changes of volume or pressure of the substance in the bulb.

In a modified construction, the upper end of the vessel is connected to the air tube and the lower end of the vessel to a vertical tube open at the top to the atmosphere. In this arrangement the air tube is branched to the condenser of a steam engine or other means for reducing the pressure in the air tube below atmospheric.

The accompanying drawings represent diagrammatically examples of arrangements according to the invention.

The drawing is an elevation, partly in section, of one embodiment of the invention.

Referring to the drawing, A is the thermometer bulb of which the upper part $a$ is adapted to be screwed into a vessel of which the temperature is to be indicated. In the example illustrated the bulb is assumed to be filled with mercury and to be made of steel.

A tube B of small bore is connected to the top of the bulb and is inserted in the bottom of the vessel C, the upper part $c$ of which is enlarged and contains baffle plates D to prevent the liquid from splashing. A cover plate E closes the upper end of the vessel and is connected to the atmosphere by a short pipe or aperture $e$.

A tube F of small bore opens into the interior of the vessel C near the bottom of the latter and is connected to one leg $g_1$ of a siphon barometer gauge G, the other leg $g_2$ of which is open to the atmosphere.

A branch tube $f$ leads from the connecting tube F to an air pump H or to a supply of air under pressure.

The mercury fills the bulb A and connecting tube B and, at the lowest temperature to be indicated, extends into the vessel C to a level just beyond the connection with the lower end of the connecting tube F. As the temperature to be indicated increases the mercury column rises correspondingly and at the temperature assumed stands at a height $x$ above the lower end of the tube F.

In order that the required temperature may be shown on the barometric gauge, air is pumped into the tube F by the air pump H, bubbles through the mercury column $x$ and escapes by the pipe $e$. The pressure of the air in the tube F is consequently dependent only on the height $x$ and this pressure is communicated to the mercury in the leg $g_1$ of the gauge G and is indicated by the reading of the level of the mercury in the leg $g_2$ on a scale I graduated in degrees of temperature.

The barometer gauge shown may be replaced by any other known device suitable for indicating pressures and liquids other than mercury may be used in the vessel C.

It is obvious that the indicating device may be in any required position and at any distance from the thermometer and that the same indicating device may be used in connection with more than one thermometer bulb.

Having thus described the nature of the said invention and the best means we know of carrying the same into practical effect, we claim:—

1. For the purpose of indicating the temperature of a distant or inaccessible place, a bulb containing a liquid, a vessel communicating with the bulb and having a horizontal cross section less than that of the bulb and containing a liquid such as mercury, the level of which varies with the changes of volume of the liquid contained in the bulb, means for causing air to flow into the liquid in the vessel, and means controlled by the pressure of the said air for indicating temperature.

2. For the purpose of indicating the temperature of a distant or inaccessible place, a bulb containing a liquid, a vessel communicating with the bulb and having a horizontal cross section less than that of the bulb and containing a liquid such as mercury, of which the level varies with changes of volume of the liquid contained in the bulb, a pressure controlled device for indicating temperature, a tube connecting the interior of the lower end of the vessel with the pressure controlled device, and means for forcing air through the connecting tube and into the liquid in the vessel.

In testimony whereof we have signed our names to this specification.

JAMES TREVELYAN FOX.
ARTHUR JENNENS MALONE.